United States Patent

[11] 3,616,018

| [72] | Inventor | Thomas John Komoly |
| | | London, England |
| [21] | Appl. No. | 632,016 |
| [22] | Filed | Apr. 19, 1967 |
| [45] | Patented | Oct. 26, 1971 |
| [73] | Assignee | Imperial Chemical Industries Limited |
| | | London, England |
| [32] | Priority | May 25, 1966 |
| [33] | | Great Britain |
| [31] | | 23405/66 |

[54] METHOD OF MAKING A STRUT EXTRUDED SHEET
10 Claims, 5 Drawing Figs.

[52] U.S. Cl. .................................................. 156/244, 156/78, 156/303, 156/306
[51] Int. Cl. .................................................. B29c 19/00
[50] Field of Search ..................................... 156/210, 244, 290, 78; 264/176

[56] References Cited
UNITED STATES PATENTS

| 3,406,052 | 10/1968 | Peters .......................... | 156/244 X |
| 3,416,986 | 12/1968 | Carley ......................... | 156/244 |
| 3,459,625 | 8/1969 | Heller, Jr. et al. ............ | 156/244 X |

*Primary Examiner*—Benjamin R. Padgett
*Assistant Examiner*—Stephen J. Lechert, Jr.
*Attorney*—Cushman, Darby & Cushman ABSTRACT: A process and apparatus for producing sheet which comprises two facing sheets joined by continuous struts which are corrugated in two dimensions of the plane of the sheet, in which longitudinally extending mandrels positioned within a rectangular die are transversely oscillated with respect to and within the limits of the die.

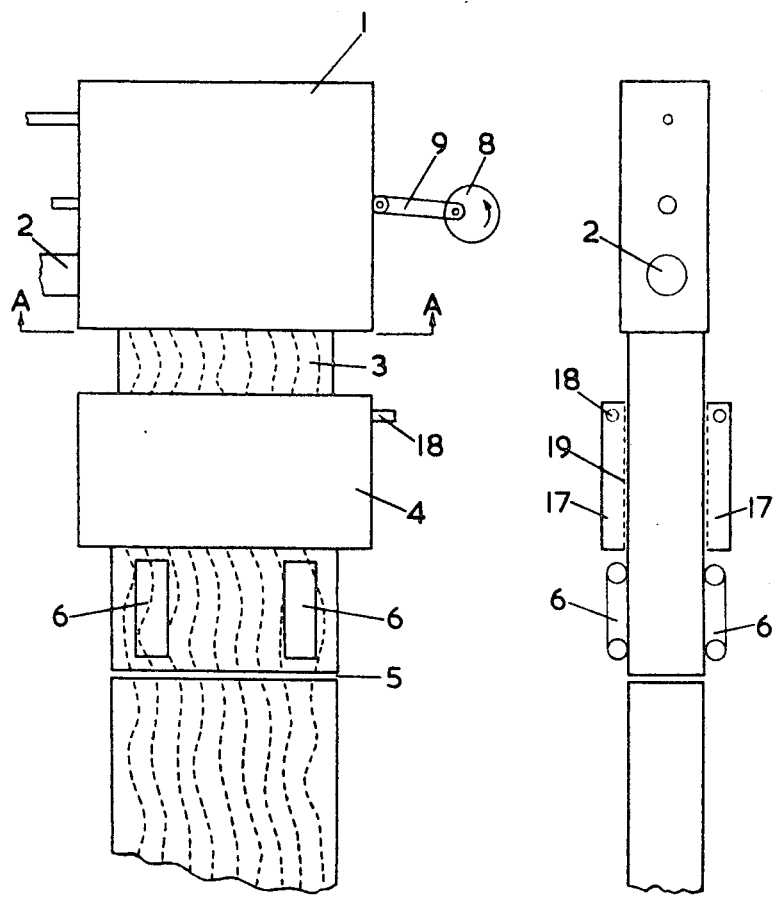

PATENTED OCT 26 1971 3,616,018

INVENTOR
THOMAS JOHN KOMOLY
BY Cushman, Darby & Cushman
ATTORNEYS

METHOD OF MAKING A STRUT EXTRUDED SHEET

This invention relates to extruded sheet suitable for use as a packaging and/or building material and to a process for its production.

Useful sheet materials for packaging combine low density with a high rigidity in all directions in the plane of the sheet. Such materials may be built up by joining two relatively thin facing panels by a number of struts of the same material or a different material to that used for the facing panels. The facing panels may be extruded from dies placed on either side of a die or series of dies from which the material forming the struts is extruded and the whole joined together at a subsequent stage to give the final packaging sheet. Alternatively the facing panels and the reinforcing struts may be extruded integrally from an arrangement which is hereinafter referred to as a "-strut reinforced sheeting die." This arrangement comprises a rectangular or slit die within which suitably positioned mandrels define the size and shape of the struts. Using such an arrangement the transverse section of the reinforced sheeting produced is of course the same at any point along its length, and consequently, although the reinforced sheeting is rigid in the direction in which it is extruded, it does not possess such a high rigidity in the direction transverse thereto. It is an object of the present invention to overcome this disadvantage.

Accordingly we provide a process in which thermoplastic polymeric material is extruded through a "strut reinforced sheeting die" as hereinbefore defined in which the mandrels positioned within the rectangular or slit die are transversely oscillated with respect to and within the limits of the rectangular or slit die.

It is important to maintain the temperature of the extruding thermoplastic material at such a value that its viscosity is sufficiently high that it will retain the configuration imparted to it by the strut reinforced sheeting die but not so high that extrusion becomes difficult or impossible.

Suitable thermoplastic materials include, for example, polyethylene, polypropylene and other poly-α-olefines, polyvinyl chloride, polystyrene, polymethyl methacrylate and copolymers of methyl methacrylate with acrylic acid and alkyl acrylates, polyoxymethylenes, polycarbonates, polyamides and polyesters which are preferably of a high molecular weight since such polyamindes and polyesters are sufficiently viscous for the operation of our process. We prefer to use polyolefines, polyvinyl chloride, and polymethyl methacrylate because these polymers are found to have the optimum qualities of extrudability and viscosity for carrying out the process of our invention. Polymers having a relatively sharply defined melting point, e.g., poly 4-methyl pentene-1 and high molecular weight polyamides and polyesters, e.g., polyhexamethylenediamine adipate or polyethylene terephthalate are also preferred because only a relatively small degree of cooling is required in order to "freeze" the corrugations imparted by our process into the extruded sheet. The thickness of the struts and/or of the facing panels may be adjusted, and in a preferred embodiment of our invention we do this by using mandrels which are longitudinally tapered so that longitudinal movement to any desired degree of one or more or of all the mandrels with respect to the rectangular or slit die vary the size of the gaps between the mandrels themselves and of the gaps between the mandrels and the rectangular or slit die. The latter gaps can also of course be varied by adjusting the width of the rectangular or slit die. The general shape and positioning of the struts with respect to the facing panels can also of course be varied by proper selection of mandrels of different shapes, e.g., mandrels of square, rectangular, triangular or other cross section may be used. Thus a very wide stepless variation of strut and facing panels may be obtained using any particular die and mandrels.

It is necessary to solidify the extruded sheet so that once it has emerged from the strut-reinforced sheeting die it retains the configuration imparted to it therein. The external surfaces may be quenched by any of the quenching means known in the art, e.g., a water bath, cooling air blasts, cooling plates or rollers etc. It is preferred also to cool the internal surfaces of the sheet (i.e., between the struts) and this may be done by blowing cooling air through holes drilled longitudinally within the oscillating mandrels. Obviously a free passage through the extruded sheeting is required in order that the cooling air should be effective and since we normally prefer to saw the sheet into lengths after extrusion and quenching such a free passage is normally provided, apart from the short time during which the cutting blade passes through the sheet. Although we prefer to use air as the cooling medium chilled water or any other gas or liquid may be used.

A typical but in no way limiting arrangement whereby the process according to our invention may be carried out may now be described with reference to the accompanying drawings in which:

FIG. 1 is a diagrammatic front elevational view of an apparatus for carrying out the process of our invention.

FIG. 2 is a side elevational view of the apparatus shown in FIG. 1.

In all the figures like numerals refer to the same parts.

Figure 3:
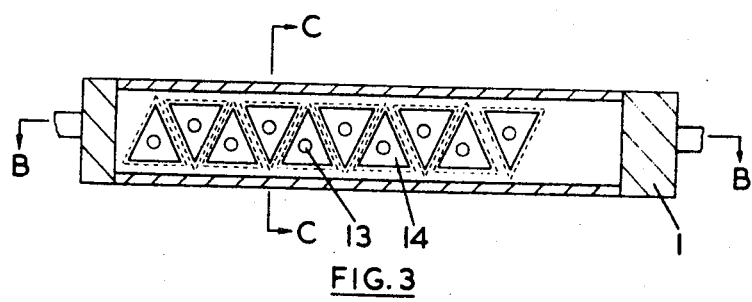
FIG. 3 is a section on line A—A of FIG. 1.
Figure 5:
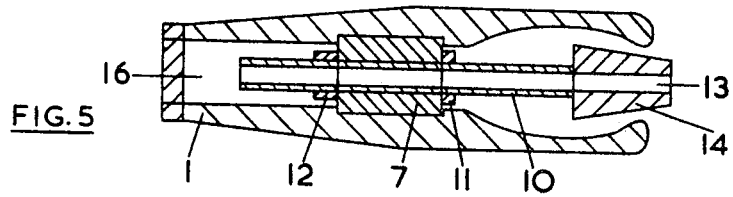
FIG. 5 is a cross section on line C—C of FIG. 3.

In FIG. 1 a strut-reinforced sheeting die 1 which is supplied with polymer through orifice 2 from an extruder (not shown) is used to extrude a sheeting 3 which is first externally chilled by cooling plates 4 and then cut into sections at position 5 by a cutting means (not shown). Caterpillar conveyors 6 are used to haul the sheet off from the quenching zone.

Figure 4:
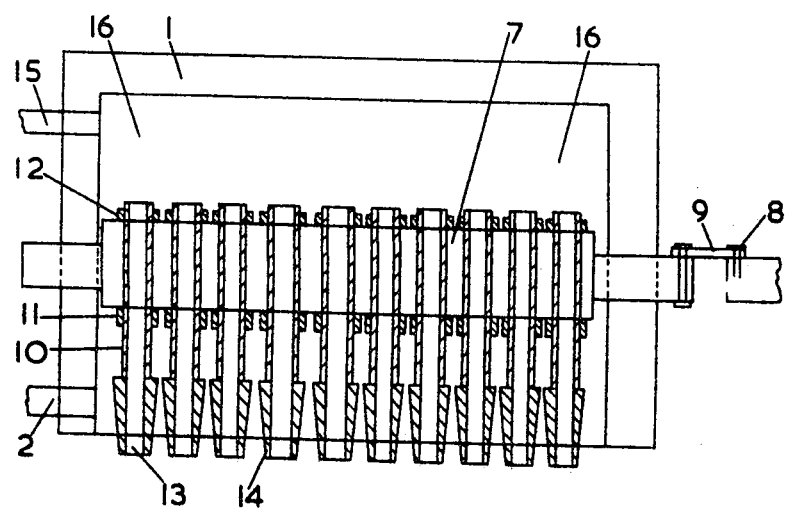
FIG. 4 is a cross section on line B—B of FIG. 3.

The construction of the strut-reinforced sheeting die can be seen in more detail with reference to FIGS. 3 and 4 from which it will be seen that it consists of a member 7 which is slidably mounted by airtight and polymertight bearings in the body of the die 1 and which can be reciprocated by means of driven wheel 8 which is connected to an extension of the member 7 by tie bar 9. Member 7 is provided with a number of channels into which the keyed shafts of mandrels 10 are slotted. Mandrels 10 are secured in position by means of lock nuts 11 and 12 and have a longitudinal passage 13. The heads 14 of the mandrels are formed in the shape of tapered triangular prisms. Air is supplied through a pipe 15 to a chamber 16 formed in the rear part of the die and into which the mandrels 10 project so that the longitudinal passages 13 provide a path for the air from chamber 16 to the interior of the extruded sheet.

In operation, therefore, the member 7 and its attached mandrels are transversely reciprocated by rotation of wheel 8 and thus polymer extruded through the die emerges in the form of a sheet in which two facing panels are integrally joined by a plurality of perpendicular corrugated struts formed in a substantially longitudinal direction.

The dimensions of the struts may be varied by loosening the locknuts 11 and 12 and sliding the mandrels 10 either in or out of member 7. Thus the profile at the die can be varied from that shown in full lines in FIG. 3 to that shown in dotted lines in FIG. 3. The gap between the lips of the die can also be varied by any of the standard die lip adjusting means (not shown). The profiles of the die and the mandrels are so shaped and positioned relative to the polymer entry duct that the whole of the free space defined by the die and mandrels is filled with polymer at the point where the sheet emerges from the die.

The cooling plates 4 consist of two chambers 17 (see FIG. 2) to which air is supplied through pipes 18 and which have surfaces 19 adjacent to the extruded sheet of a porous material, e.g., sintered bronze.

The amplitude and the wavelengths of the corrugations imparted to the struts will depend respectively on the degree of oscillation of member 7 and on the relative rates of oscillation of member 7 and of extrusion. We prefer that the amplitude should be at least equal to the lateral spacing of the struts. It is also preferred that the wavelength and amplitude are such that each strut crosses its own longitudinal axis at an angle of about 45° since this leads to the most balanced stiffness in the sheet produced.

Sheets having an overall thickness of from 1/16 inch to 4 inches may be produced according to the process of our invention but the most conveniently and economically produced sheets are those having a thickness of from ⅛ inch to 1 inch. The width of the sheets may be up to 400 times their thickness. The thickness of the facing panels and the thickness of the reinforcing struts may preferably vary from 0.003 inch to 0.125 inch. This of course does not refer to the extreme edge portions of the sheet which, since they consist of solid polymer, exceed these limits at least over part of the sheeting.

Fillers, reinforcing fibers and/or other additives may be incorporated into the thermoplastic material of which the sheets are made. Polymers expanded by blowing agents may also be used, e.g., foamed sheets of polystyrene or of copolymers comprising styrene and maleic anhydride.

I claim:

1. A process for the production of strut-reinforced sheet material which comprises extruding thermoplastic polymeric material in the molten state from a die comprising walls surrounding a rectangular opening through which the molten plastic flows and a plurality of mandrels within said opening spaced from said walls and laterally spaced from each other so that plastic flows through the spaces between the mandrels and the space between said mandrels and said walls to form, when solidified, laterally spaced struts and so that plastic flows between said mandrels and said die to form facing panels connected by said struts, transversely oscillating said mandrels with respect to and within the limits of said rectangular die to corrugate said struts and solidifying the extruded sheet.

2. A process according to claim 1 in which said thermoplastic polymeric material is a polyolefine.

3. A process according to claim 1 in which said thermoplastic polymeric material is polyvinyl chloride.

4. A process according to claim 1 in which said thermoplastic polymeric material is polymethyl methacrylate.

5. A process according to claim 1 in which said thermoplastic polymeric material is a high molecular weight polyamide.

6. A process according to claim 1 in which said thermoplastic polymeric material is a high molecular weight polyester.

7. A process according to claim 1 in which said thermoplastic polymeric material has a filler incorporated therein.

8. A process according to claim 1 in which said thermoplastic polymeric material has a blowing agent incorporated therein.

9. A process according to claim 1 in which the freshly extruded sheet material is cooled internally as well as externally.

10. A process according to claim 9 in which said internal cooling is by means of cooling air.

* * * * *